(12) United States Patent
Yu et al.

(10) Patent No.: US 11,773,028 B2
(45) Date of Patent: Oct. 3, 2023

(54) COMPOSITE MATERIAL AND METHOD OF REMOVING FLUORIDE ION IN WASTE LIQUID

(71) Applicant: INDUSTRIAL TECHNOLOGY RESEARCH INSTITUTE, Hsinchu (TW)

(72) Inventors: Sheng-Min Yu, Taoyuan (TW); Sheng-Yi Chiu, New Taipei (TW); Chien-Chung Hsu, Taichung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 262 days.

(21) Appl. No.: 17/036,801

(22) Filed: Sep. 29, 2020

(65) Prior Publication Data

US 2021/0188715 A1    Jun. 24, 2021

(30) Foreign Application Priority Data

Dec. 20, 2019 (EP) .................................... 19219135

(51) Int. Cl.
*C04B 35/553* (2006.01)
*C02F 1/28* (2023.01)
*C02F 101/14* (2006.01)

(52) U.S. Cl.
CPC ............ *C04B 35/553* (2013.01); *C02F 1/281* (2013.01); *C02F 2101/14* (2013.01); *C04B 2235/3206* (2013.01); *C04B 2235/3208* (2013.01); *C04B 2235/3217* (2013.01); *C04B 2235/3262* (2013.01); *C04B 2235/3272* (2013.01); *C04B 2235/3418* (2013.01);

(Continued)

(58) Field of Classification Search
None
See application file for complete search history.

(56) References Cited

U.S. PATENT DOCUMENTS

| | | |
|---|---|---|
| 4,226,710 A | 10/1980 | Bruckenstein |
| 7,960,021 B2 | 6/2011 | Im et al. |

FOREIGN PATENT DOCUMENTS

| | | |
|---|---|---|
| CN | 1332116 A | 1/2002 |
| CN | 102432276 B | 8/2013 |
| CN | 105664842 A | 6/2016 |

(Continued)

OTHER PUBLICATIONS

Kong et al., Synchronous phosphate and fluoride removal from water by 3D rice-like lanthanum-doped La@MgAl nanocomposites, Chemical Engineering Journal, 2019, 371, 893-902 (Year: 2019).*

(Continued)

*Primary Examiner* — Coris Fung
*Assistant Examiner* — Keling Zhang
(74) *Attorney, Agent, or Firm* — Birch, Stewart, Kolasch & Birch, LLP

(57) ABSTRACT

A method of removing fluoride ion from waste liquid is provided, which includes providing a calcium source and a plurality of ceramic particles to a waste liquid containing fluoride ion for forming a plurality of calcium fluoride layers wrapping the ceramic particles. The calcium fluoride layers are connected to form a calcium fluoride bulk. The ceramic particles are embedded in the calcium fluoride bulk. The ceramic particles and the calcium fluoride bulk have a weight ratio of 1:4 to 1:20.

6 Claims, 3 Drawing Sheets

(52) U.S. Cl.
CPC .............. *C04B 2235/5436* (2013.01); *C04B 2235/5445* (2013.01); *C04B 2235/77* (2013.01)

(56) References Cited

FOREIGN PATENT DOCUMENTS

| | | |
|---|---|---|
| CN | 104835545 B | 3/2017 |
| JP | 2005-21855 A | 1/2005 |
| KR | 10-1264596 B1 | 5/2013 |
| TW | I280951 B | 5/2007 |
| TW | I449668 B | 8/2014 |
| TW | I498129 B | 9/2015 |
| TW | I591022 B | 7/2017 |

OTHER PUBLICATIONS

Aldaco et al., "Calcium fluoride recovery from fluoride wastewater in a fluidized bed reactor", Water Research, 2007, vol. 41, p. 810-818.

Aldaco et al., "Fluoride Recovery in a Fluidized Bed: Crystallization of Calcium Fluoride on Silica Sand", Ind. Eng. Chem. Res., 2006, vol. 45, p. 796-802.

Broeck et al., "Sustainable Treatment of HF Wastewaters From Semiconductor Industry With a Fluidized Bed Reactor", IEEE Transactions on Semiconductor Manufacturing, Aug. 2003, vol. 16, No. 3, p. 423-428.

Search Report issued in European application 19219135.1, dated Jul. 13, 2020.

Tai et al., "Growth kinetics of CaF2 in a pH-stat fluidized-bed crystallizer", Journal of Crystal Growth, 2006, vol. 290, p. 576-584.

Taiwanese Office Action and Search Report for Taiwanese Application No. 109115162, dated Dec. 25, 2020.

* cited by examiner

COMPOSITE MATERIAL AND METHOD OF REMOVING FLUORIDE ION IN WASTE LIQUID

CROSS REFERENCE TO RELATED APPLICATIONS

The present application is based on, and claims priority from, EP Application Serial Number 19219135.1, filed on Dec. 20, 2019, the disclosure of which is hereby incorporated by reference herein in its entirety.

TECHNICAL FIELD

The technical field relates to method of removing fluoride ion from waste liquid, and in particular, it relates to the ceramic particles thereof.

BACKGROUND

Since hydrofluoric acid (HF) is widely used in cleaning waters or substrates, especially for semiconductors, optoelectronics panels, solar cells, etc., in Taiwan, for example, the usage amount of hydrofluoric acid is extremely high (at least 50,000 tons to 100,000 tons depending on the capacity utilization rate). In metric tons per year, the waste hydrofluoric acid discharged is a multiple of the amount used, because the cleaning process will be washed with ultrapure water, and naturally more hydrofluoric acid-containing waste liquid will be discharged. Waste water containing hydrofluoric acid must be recycled and treated, otherwise it will cause environmental pollution and damage.

In general, when hydrofluoric acid-containing waste is treated, a large amount of alkali must be used for neutralization treatment, and a lot of fine sludge is produced, which is very difficult and costly to handle. Moreover, if it is impossible to reproduce as industrially usable product such as calcium fluoride ($CaF_2$), it can only be treated as sludge, which is very wasteful of resources and uneconomical.

SUMMARY

One embodiment of the disclosure provides a composite material, including: a plurality of ceramic particles embedded in a calcium fluoride bulk, wherein the ceramic particles and the calcium fluoride bulk have a weight ratio of 1:4 to 1:20.

In some embodiments, the ceramic particles include oxides of 100 parts by weight of calcium, 30 to 95 parts by weight of iron, 15 to 50 parts by weight of silicon, 2 to 15 parts by weight of magnesium, 2 to 20 parts by weight of aluminum, and 2 to 10 parts by weight of manganese.

In some embodiments, the ceramic particles include a plurality of spinels distributed therein.

In some embodiments, the ceramic particles and the spinels have a weight ratio of 1:0.2 to 1:0.5.

In some embodiments, the ceramic particles have a diameter of 0.1 μm to 1000 μm.

In some embodiments, the density of the ceramic particles is between 3 g/cm³ to 6 g/cm³.

One embodiment of the disclosure provides a method of removing fluoride ion from waste liquid, including: providing a calcium source and a plurality of ceramic particles to a waste liquid containing fluoride ion for forming a plurality of calcium fluoride layers wrapping ceramic particles, wherein the calcium fluoride layers are connected to form a calcium fluoride bulk, and the ceramic particles are embedded in the calcium fluoride bulk, wherein the ceramic particles and the calcium fluoride bulk have a weight ratio of 1:4 to 1:20.

In some embodiments, the calcium source includes calcium chloride, calcium hydroxide, calcium carbonate, or a combination thereof.

In some embodiments, the ceramic particles include oxide of 100 parts by weight of calcium, 50 to 95 parts by weight of iron, 40 to 50 parts by weight of silicon, 2 to 15 parts by weight of magnesium, 2 to 20 parts by weight of aluminum, and 2 to 10 parts by weight of manganese.

In some embodiments, the ceramic particles include a plurality of spinels distributed therein.

In some embodiments, the ceramic particles and the spinels have a weight ratio of 1:0.2 to 1:0.5.

In some embodiments, the ceramic particles have a diameter of 0.1 μm to 1000 μm.

In some embodiments, the method further includes providing a pH adjuster to the waste liquid to adjust the pH value of the waste liquid to 7 to 10.

A detailed description is given in the following embodiments with reference to the accompanying drawings.

BRIEF DESCRIPTION OF THE DRAWINGS

The disclosure can be more fully understood by reading the subsequent detailed description and examples with references made to the accompanying drawings, wherein.

DETAILED DESCRIPTION

Figure 1:
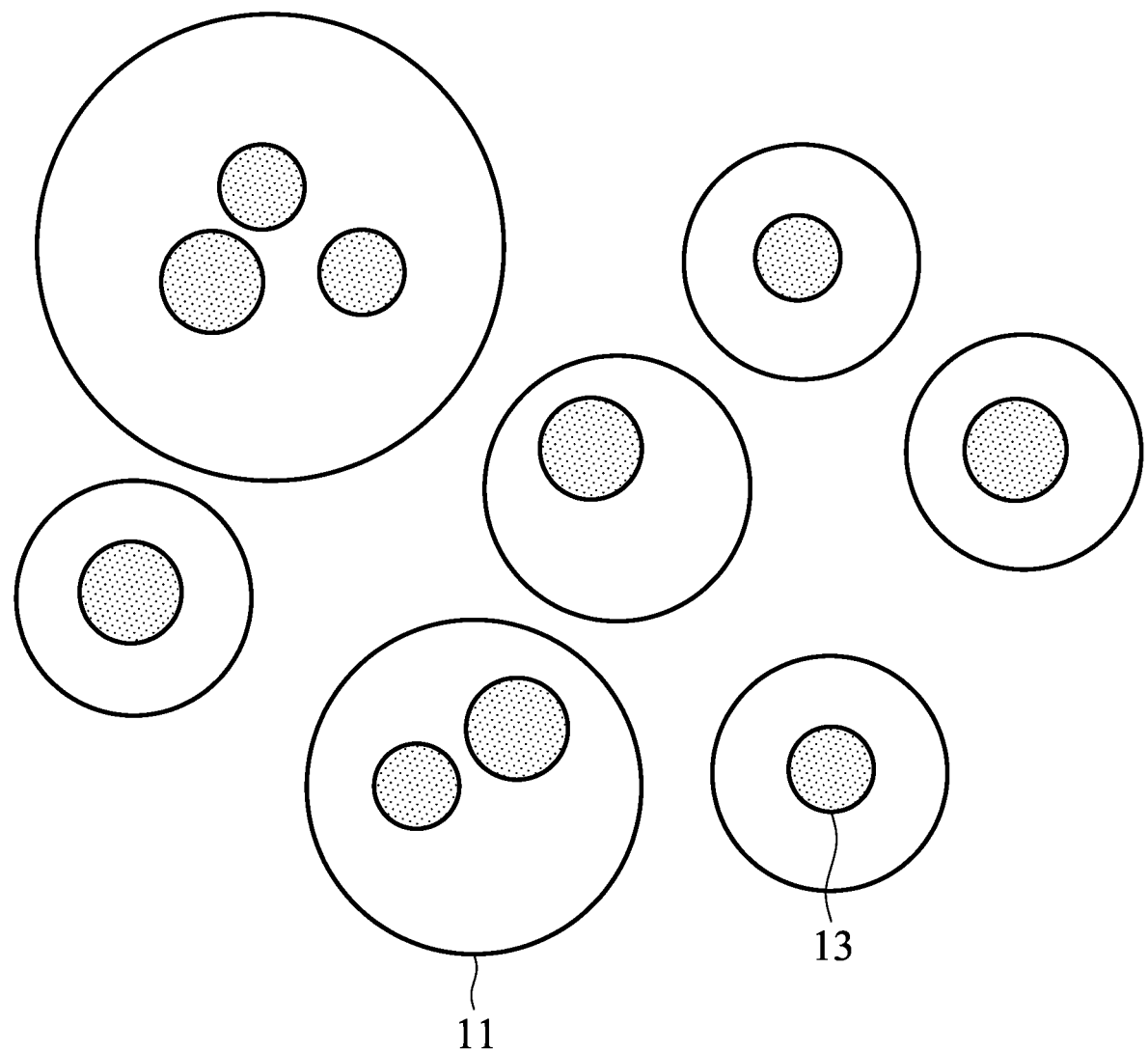
FIG. 1 shows a calcium fluoride layer wrapping a ceramic particle in one embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

One embodiment of the disclosure provides a method of removing fluoride ion from waste liquid. First, providing a calcium source and a plurality of ceramic particles to a waste liquid containing fluoride ion, thereby forming a plurality of calcium fluoride layers 11 wrapping the ceramic particles 13, as shown in FIG. 1. Although the ceramic particles 13 are ball-shaped in FIG. 1, the ceramic particles 13 can be other shapes such as oval, polygon shaped, or another suitable shape. In addition, the surface of the ceramic particles 13 is rough, which is beneficial for growing calcium fluoride layer 11 thereon.

In some embodiment, the waste liquid is aqueous solution. Alternatively, the waste liquid can be mainly composed of organic solvent, such as alcohol, acetone, and other polar solvent that is used in semiconductor industry and polluted by fluoride ion source (e.g. hydrofluoric acid). In the waste liquid containing fluoride ion, the fluoride ion concentration can be 100 mg/L to 10000 mg/L. If the fluoride ion concentration is too low, calcium fluoride layer cannot grow on the ceramic particles. If the fluoride ion concentration is too high, calcium fluoride layer will grow not only on the ceramic but also on the tank surface. However, the fluoride waste liquid should not be diluted before treatment, which may save water during the treatment. The calcium source should be added to fluoride ion-containing waste liquid, and the calcium source and the waste liquid have a weight ratio of 7:3 to save water. In some embodiments, the calcium source added to the waste liquid can be calcium chloride, calcium hydroxide, calcium carbonate, or a combination thereof.

The ceramic particles may serve as seeds to grow the calcium fluoride layer thereon. In some embodiments, the ceramic particles include oxide of 100 parts by weight of calcium, 50 to 95 parts by weight of iron, 40 to 50 parts by weight of silicon, 2 to 15 parts by weight of magnesium, 2 to 20 parts by weight of aluminum, and 2 to 10 parts by weight of manganese. If the iron ratio is too low, the density of ceramic particles will be lower than 3 g/cm$^3$. If the iron ratio is too high, iron ion could be dissolved into the waste water. If the silicon ratio is too low, the strength of the ceramic powder will be not good enough. If the silicon ratio is too high, the fluoride ion resistance of the ceramic powder will be not enough, and the ceramic powder could be dissolved in the waste water. If the magnesium ratio is too low, the ratio of the spinel will be insufficient. If the magnesium ratio is too high, the expansion rate of the ceramic particles will increases. If the aluminum ratio is too low, the hardness of the ceramic particles will be insufficient. If the aluminum ratio is too high, fluoride ion resistance of the ceramic powder will be not enough, and the ceramic powder could be dissolved in the waste water. If the manganese ratio is too low, the ratio of the spinel will be insufficient and the density of the ceramic powder will be lower than 3 g/cm$^3$. If the manganese ratio is too high, the cost of ceramic particles will increase. For example, calcium source (e.g. calcium carbonate, calcium hydroxide, or calcium oxide), iron source iron nitrate, ferric oxide, or ferrous oxide), silicon source (e.g. silicon oxide, or silica sand), magnesium source (e.g. magnesium carbonate, magnesium oxide, or magnesium acetate), aluminum source (e.g. aluminum nitrate, aluminum hydroxide, or aluminum oxide), and manganese (e.g. manganese nitrate, manganese dioxide, or manganese(III) oxide) of chemical stoichiometry are mixed, and sintered at 1000° C. to 1500° C. for 1.5 hours to 5 hours to obtain the ceramic particles. Alternatively, some raw materials of the elements may simultaneously contain at least two elements, such as calcium silicate (containing silicon and calcium). If the sintering temperature is too low or the sintering period is too short, the ratio of the spinel will be insufficient. If the sintering temperature is too high or the sintering period is too long, the crystal will be too large and the size of the powder will increase, or the ceramic powder will react with crucible and cause pollutant.

Figure 2:
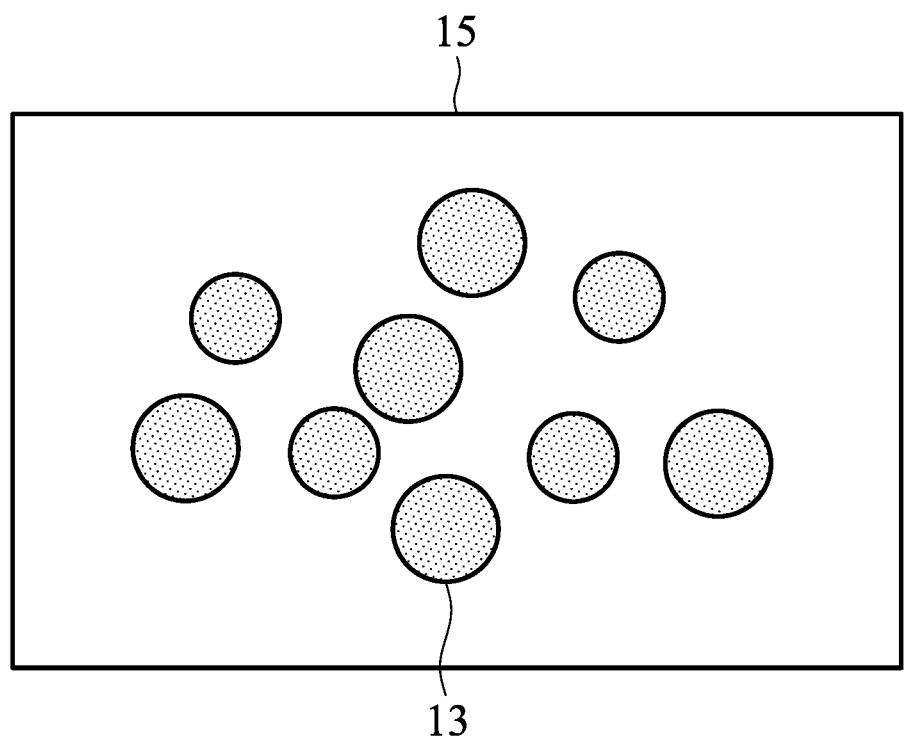
FIG. 2 shows a composite of calcium fluoride bulk with ceramic particles embedded therein in one embodiment.

As shown in FIG. 1, the calcium fluoride layers 11 wrapping the ceramic particles 13, respectively are further connected to form a calcium fluoride bulk 15, and the ceramic particles 13 are embedded in the calcium fluoride bulk 15, as shown in FIG. 2. The ceramic particles 13 and the calcium fluoride bulk 15 have a weight ratio of 1:4 to 1:20. If the ratio of the calcium fluoride bulk 15 is too high, the calcium fluoride bulk 15 will be difficult to be dried due to overly high water content. If the ratio of the calcium fluoride bulk 15 is too low, the cost of removing fluoride ion will be too high.

In some embodiments, the ceramic particles include a plurality of spinels distributed therein. In some embodiments, the ceramic particles and the spinels have a weight ratio of 1:0.2 to 1:0.5. If the ratio of the spinels is too low, the density of the ceramic powder will be low and the fluoride ion resistance of the ceramic powder will be weak. If the ratio of the spinels is too high, the ceramic particles will have higher density as well as its weight. In some embodiments, the ceramic particles have a diameter of 0.1 µm to 1000 µm. If the diameters of the ceramic particles are too small, the thickness of the shell layer will be insufficient, therefore, the water resistance will be lower and result in the expansion of the ceramic particles. If the diameters of the ceramic particles are too large, the reactive surface of the ceramic particles will be too low, and calcium fluoride crystallization rate will be therefore slow. In some embodiments, the density of the ceramic particles 13 is between 3 g/cm$^3$ to 6 g/cm$^3$. If the density of the ceramic particles 13 is too low, the ceramic particles will easily float over the waste liquid, and it will be difficult to crystallize calcium fluoride. If the density of the ceramic particles 13 is too high, the ceramic particles will easily sink to the bottom of the waste liquid, and it will be also difficult to crystallize calcium fluoride.

In some embodiments, a pH adjuster is further provided to the waste liquid to adjust the pH value of the waste liquid to 7 to 10. If the pH value of the waste liquid is too low, the growth rate of calcium fluoride will be too slow. If the pH value of the waste liquid is too high, the calcium fluoride will become porous. In some embodiment, if the calcium source added to the waste liquid is alkaline Ca(OH)$_2$), the step of providing the pH adjuster can be omitted. In addition, when the calcium of the calcium source and the fluoride ion of the waste liquid are reacted to form the calcium fluoride layer, and the acid and alkaline are neutralized, a large heat may be generated. As such, the temperature of the above method of removing fluoride ion in the waste liquid can be controlled (e.g. to 15° C. to 30° C.) by a cooler for safety.

The fluoride ion concentration of the waste liquid can be greatly reduced by the above method. For example, the original waste water may contain a hydrofluoric acid concentration of 100 mg/L to 10000 mg/L, and the treated waste water may contain a hydrofluoric acid concentration lower than 15 mg/L. The treated waste water can be recycled for other application. Moreover, the composite material of the calcium fluoride bulk with ceramic particles embedded therein can be easily dried due to its low water content (e.g. <15%), which can be used in other applications.

Note if only the calcium source is added to the waste liquid containing fluoride ion to form the calcium fluoride, it will form a sludge of the calcium fluoride rather than the calcium fluoride bulk (solid). The sludge is difficult to be collected and dried due to its large amount of water, and the sludge may suspend in the waste liquid and be difficult to remove. In other words, the ceramic powder may efficiently simplify the process of removing fluoride ion in waste liquid.

The above method of removing fluoride ion from waste liquid can be performed in batch-type or continuous-type. For a suitable apparatus of performing the method, the reader may refer to Taiwan Patent No. 310313, Taiwan Patent No. 1449668, or TW patent No. 1591022, or another suitable apparatus disclosed in the art.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLES

Example 1

Figure 3:
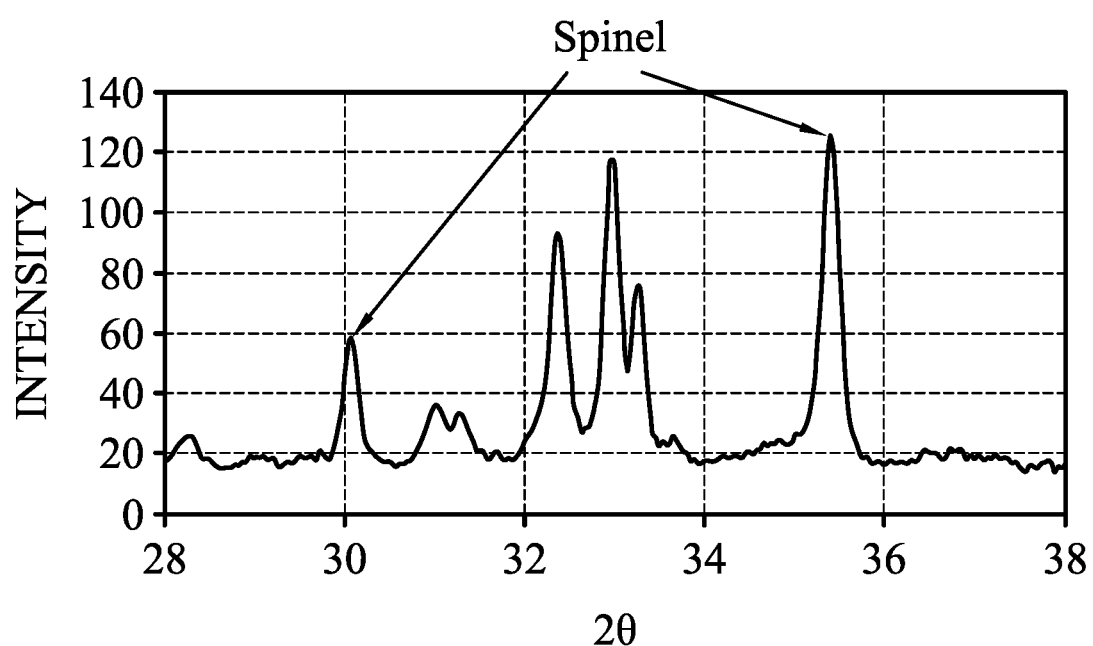
FIG. 3 shows an X-ray diffraction (XRD) spectrum of ceramic cores in one embodiment.

Calcium carbonate, iron oxide, silicon oxide, magnesium oxide, aluminum oxide, and manganese dioxide were mixed according to chemical stoichiometry, then heated to 1200° C. and sintered for 3 hours to form ceramic cores, which could include an oxide of 100 parts by weight of calcium, 75 parts by weight of iron, 19 parts by weight of silicon, 8 parts by weight of magnesium, 6 parts by weight of aluminum, and 6 parts by weight of manganese. The ceramic cores (particles) were analyzed by XRD and it showed diffraction peaks at 30.1 degrees and 35.4 degrees, as shown in FIG. 3, which meant that the ceramic cores had spinels therein. The ceramic cores had a diameter of 0.1 μm to 40 μm.

PH value of hydrofluoric acid-containing waste water (obtained from semiconductor manufacture) was first adjusted to 7.7 with NaOH solution, and the waste water had a fluoride ion concentration of 800 mg/L and a volume of 100 mL (determined by fluoride ion meter). 40 mL of $CaCl_2$ solution (3000 mg/L), 30 g of the ceramic particles were added into the waste water and stirred at room temperature for 24 hours. The fluoride ion in the waste water and the calcium ions were bonded to form a $CaF_2$ layer to wrap the ceramic powders, and the $CaF_2$ layer was connected to form a $CaF_2$ bulk, and the ceramic particles were embedded in the $CaF_2$ bulk. The $CaF_2$ bulk was a dense solid that was easily collected from the waste water. The waste water after the above treatment had a fluoride ion concentration of 6.4 mg/L (determined by fluoride ion meter). Accordingly, the ceramic particles could efficiently remove fluoride ion in the use water.

Example 2

Calcium oxide, ferrous oxide, silicon oxide, magnesium acetate, aluminum hydroxide, and manganese acetate were mixed according to chemical stoichiometry, then heated to 1100° C. and sintered for 5 hours to form ceramic cores, which could include an oxide of 100 parts by weight of calcium, 81 parts by weight of iron, 19 parts by weight of silicon, 10 parts by weight of magnesium, 7 parts by weight of aluminum, and 7 parts by weight of manganese. The ceramic cores (particles) were analyzed by XRD and it showed diffraction peaks at 30.1 degrees and 35.4 degrees, which meant that the ceramic cores had spinets therein. The ceramic cores had a diameter of 1 μm to 50 μm.

PH value of hydrofluoric acid-containing waste water (obtained from semiconductor manufacture) was first adjusted to 7.7 with NaOH solution, and the waste water had a fluoride ion concentration of 800 mg/L and a volume of 100 mL (determined by fluoride ion meter). 40 mL of $CaCl_2$ solution (3000 mg/L), 30 g of the ceramic particles were added into the waste water and stirred at room temperature for 24 hours. The fluoride ion in the waste water and the calcium ions were bonded to form a $CaF_2$ layer to wrap the ceramic powders, and the $CaF_2$ layer was connected to form a $CaF_2$ bulk, and the ceramic particles were embedded in the $CaF_2$ bulk. The $CaF_2$ bulk was a dense solid that was easily collected from the waste water. The waste water after the above treatment had a fluoride ion concentration of 5.9 mg/L (determined by fluoride ion meter). Accordingly, the ceramic particles could efficiently remove fluoride ion in the waste water.

Example 3

Calcium carbonate, iron powder, silicon oxide, magnesium hydroxide, aluminum nitrate, and manganic oxide were mixed according to chemical stoichiometry, then heated to 1300° C. and sintered for 1 hour to form ceramic cores, which could include an oxide of 100 parts by weight of calcium, 95 parts by weight of iron, 20 parts by weight of silicon, 8 parts by weight of magnesium, 19 parts by weight of aluminum, and 6 parts by weight of manganese. The ceramic cores (particles) were analyzed by XRD and it showed diffraction peaks at 30.1 degrees and 35.4 degrees, which meant that the ceramic cores had spinels therein. The ceramic cores had a diameter of 0.8 μm to 30 μm.

PH value of hydrofluoric acid-containing waste water (obtained from semiconductor manufacture) was first adjusted to 7.7 by adding NaOH solution, and the waste water had a fluoride ion concentration of 800 mg/L and a volume of 100 mL (determined by fluoride ion meter). 40 mL of $CaCl_2$ solution (3000 mg/L), 30 g of the ceramic particles were added into the waste water and stirred at room temperature for 24 hours. The fluoride ion in the waste water and the calcium ions were bonded to form a $CaF_2$ layer to wrap the ceramic powders, and the $CaF_2$ layer was connected to form a $CaF_2$ bulk, and the ceramic particles were embedded in the $CaF_2$ bulk. The $CaF_2$ bulk was a dense solid that was easily collected from the waste water. The waste water after the above treatment had a fluoride ion concentration of 6.2 mg/L (determined by fluoride ion meter). Accordingly, the ceramic particles could efficiently remove fluoride ion in the waste water.

Comparative Example 1

PH value of hydrofluoric acid-containing waste water (obtained from semiconductor manufacture) was first adjusted to 7.7 with NaOH solution, and the waste water had a fluoride ion concentration of 800 mg/L and a volume of 100 mL (determined by fluoride ion meter). 40 mL of $CaCl_2$ solution (3000 mg/L), 30 g of the 325 mesh silicon dioxide (Sigma-Aldrich 342890) were added into the waste water and stirred at room temperature for 24 hours. The silicon dioxide particles were dissolved in the waste water. As such, the fluoride ion in the waste water and the calcium ions were bonded to form $CaF_2$ sludge. The $CaF_2$ sludge was difficult to be collected from the waste water. For example, the $CaF_2$ sludge contains at least 70 wt % of water, it consumed additional time and energy to dry the $CaF_2$ sludge. In addition, the $CaF_2$ sludge would remain (e.g. suspend) in the waste water, which is difficult to remove. Accordingly, the silicon oxide particles were not suitable to remove fluoride ion in the waste water.

Comparative Example 2

PH value of hydrofluoric acid-containing waste water (obtained from semiconductor manufacture) was first adjusted to 7.7 by adding NaOH solution and the waste water had a fluoride ion concentration of 800 mg/L and a volume of 100 mL (determined by fluoride ion meter). 40 mL of $CaCl_2$ solution (3000 mg/L), 30 g of the 325 mesh $CaF_2$ (Sigma-Aldrich 01905) were added into the waste water and stirred at room temperature for 24 hours. The fluoride ion in the waste water and the calcium ions were bonded to form a $CaF_2$ layer to wrap the $CaF_2$ particles, and the $CaF_2$ layer was connected to form $CaF_2$ bulk, and the $CaF_2$ particles were embedded in the $CaF_2$ bulk. The $CaF_2$ bulk was a dense solid that was easily collected from the waste water. The waste water after the above treatment had a fluoride ion concentration of 6 mg/L (determined by fluoride ion meter). Although the $CaF_2$ particles could efficiently remove fluoride ion in the waste water, the cost of CaF$_2$ is much higher than that of the ceramic particles. For example, the CaF$_2$ costs 10 USD/kg, and the ceramic particles costs 1 USD/kg.

The compositions of Example 1, Example 2, Example 3, Comparative Example 1 and Comparative Example 2 were summarized as Table 1 to make it easy to understand this disclosure.

TABLE 1

| | Composition |
|---|---|
| Example 1 | an oxide of 100 parts by weight of calcium, 75 parts by weight of iron, 19 parts by weight of silicon, 8 parts by weight of magnesium, 6 parts by weight of aluminum, and 6 parts by weight of manganese |
| Example 2 | an oxide of 100 parts by weight of calcium, 81 parts by weight of iron, 19 parts by weight of silicon, 10 parts by weight of magnesium, 7 parts by weight of aluminum, and 7 parts by weight of manganese |
| Example 3 | an oxide of 100 parts by weight of calcium, 95 parts by weight of iron, 20 parts by weight of silicon, 8 parts by weight of magnesium, 19 parts by weight of aluminum, and 6 parts by weight of manganese |
| Comparative Example 1 | silicon dioxide |
| Comparative Example 2 | CaF$_2$ |

It will be apparent to those skilled in the art that various modifications and variations can be made to the disclosed methods and materials. It is intended that the specification and examples be considered as exemplary only, with the true scope of the disclosure being indicated by the following claims and their equivalents.

What is claimed is:

1. A method of removing fluoride ion from waste liquid, comprising:
    providing a calcium source and a plurality of ceramic particles to the waste liquid containing the fluoride ion for forming a plurality of calcium fluoride layers wrapping the plurality of ceramic particles,
    wherein the plurality of calcium fluoride layers are connected to form a calcium fluoride bulk, and the plurality of ceramic particles are embedded in the calcium fluoride bulk,
    wherein the plurality of ceramic particles and the calcium fluoride bulk have a weight ratio of 1:4 to 1:20, and
    wherein the plurality of ceramic particles comprise oxides of 100 parts by weight of calcium, 50 to 95 parts by weight of iron, 15 to 40 parts by weight of silicon, 2 to 15 parts by weight of magnesium, 2 to 20 parts by weight of aluminum, and 2 to 10 parts by weight of manganese.

2. The method as claimed in claim 1, wherein the calcium source comprises calcium chloride, calcium hydroxide, calcium carbonate, or a combination thereof.

3. The method as claimed in claim 1, wherein the plurality of ceramic particles include a plurality of spinels distributed therein.

4. The method as claimed in claim 3, wherein the plurality of ceramic particles and the plurality of spinels have a weight ratio of 1:0.2 to 1:0.5.

5. The method as claimed in claim 1, wherein the plurality of ceramic particles have a diameter of 0.1 μm to 1000 μm.

6. The method as claimed in claim 1, further comprising providing a pH adjuster to the waste liquid to adjust a pH value of the waste liquid to 7 to 10.

* * * * *